R. M. ROBINSON.
FARE-BOX.

No. 175,876. Patented April 11, 1876.

Witnesses:
L. F. Brous
A. P. Grant

Inventor:
R. Miles Robinson
by John A. Gudersheim
Atty.

UNITED STATES PATENT OFFICE.

R. MILES ROBINSON, OF PHILADELPHIA, PENNSYLVANIA.

IMPROVEMENT IN FARE-BOXES.

Specification forming part of Letters Patent No. 175,876, dated April 11, 1876; application filed May 22, 1875.

*To all whom it may concern:*

Be it known that I, R. MILES ROBINSON, of the city and county of Philadelphia and State of Pennsylvania, have invented a new and useful Improvement in Fare-Boxes; and I do hereby declare the following to be a clear and exact description of the nature thereof, sufficient to enable others skilled in the art to which my invention appertains, to fully understand, make, and use the same, reference being had to the accompanying drawings making part of this specification, in which—

Figure 1:
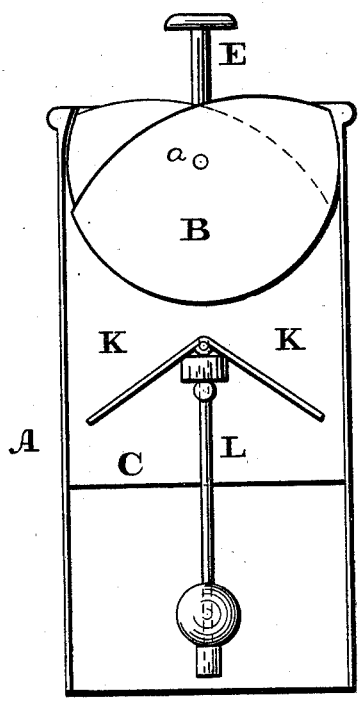
Figure 2:
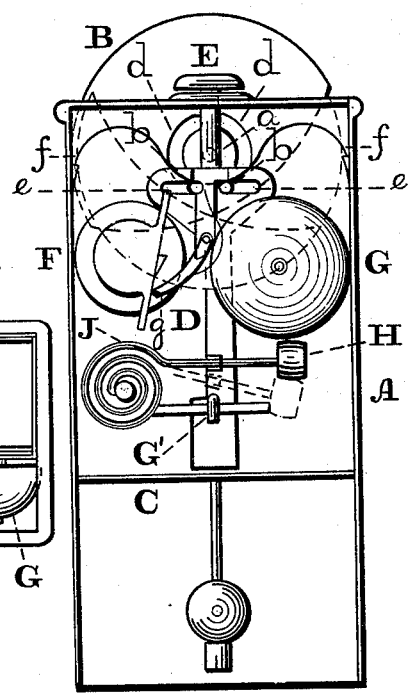
Figure 5:
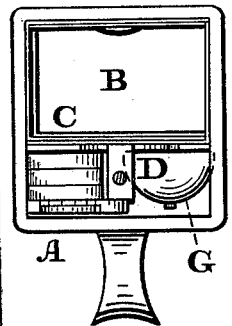
Figure 4:
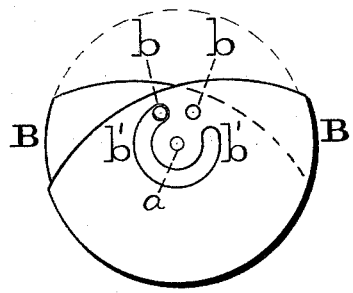
Figure 3:
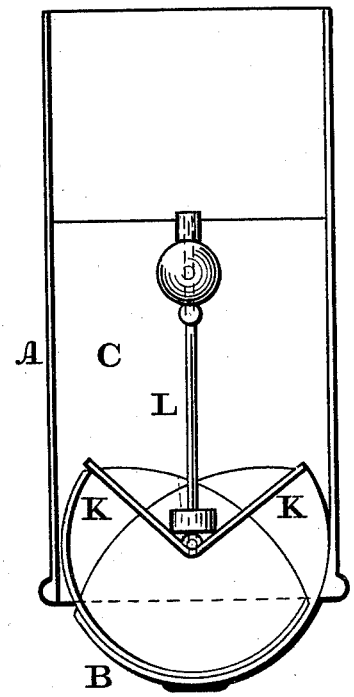
Figure 6:
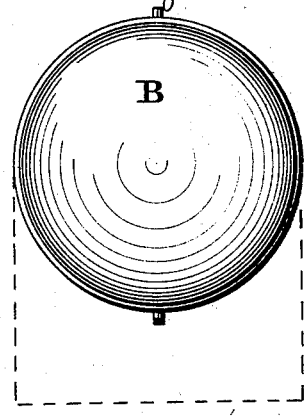

Figure 1 is a front view of the interior of the device embodying my invention, the hopper thereof being opened above and closed below. Fig. 2 is a rear view thereof, the hopper being closed above and open below. Fig. 3 is a view similar to Fig. 1, the parts being inverted. Fig. 4 is a rear view of the hopper detached. Fig. 5 is a top view of Fig. 1. Fig. 6 is a top view of a modification of the hopper.

Similar letters of reference indicate corresponding parts in the several figures.

My invention consists in a hopper which presents a wide mouth, an ample receptacle for fares and large exit opening; and it is composed of two bodies having a common axis, and rotating so as to cover and uncover each other, whereby the hopper will be duly closed and opened successively for the discharge of the collected fare into the box and the reception of the next fare. It also consists in the two bodies connected to a sliding bar so as to be moved toward and from each other and thus close and open the hopper. It also consists in a trap which automatically closes the hopper when the box is inverted. It also consists in an arm or lug on a sliding bar for direct engagement with the spring-arm of the bell-hammer for easily and sharply striking the bell.

Referring to the drawings, A represents the fare-box, in the upper end of which there are hung two bodies, B B, which are of semi-cylindrical or hemispherical shape, or of the form of portions of cylinders or spheres, and they are fitted one within the other and have a common axis, $a\ a$. From one side of each cylinder there projects outwardly a pin, $b$, the pin of the inner cylinder projecting through a circular slot, $b'$, in the other cylinder. In the box A there is arranged a vertical partition, C, near the upper end of which there are formed two arc-shaped slots, $d$, which curve toward each other, and through the slots project the pins $b\ b$ of the bodies B. D represents a sliding bar which is fitted to the partition C, and its upper end is formed with a horizontal transversely-extending slot or slots, $e$, in which enter the pins $b\ b$ of the bodies B. This bar D has a reciprocating motion and is depressed by the action of a push-rod, lever, or trigger, E, which, secured to the bar, passes through the top plate of the box A, and is within convenient reach of the thumb or fingers of the hand, the ascent or return motion of the bar being caused by the action of a spring, $f$, suitably applied. When the bodies are in their normal position they are open above, and the pins $b\ b$ are in the upper ends of the curved slots $d\ d$. It will be seen that the two bodies B form the hopper of the box A and present an exceedingly wide mouth and ample receptacle for fares both large and small.

When the fare is received the conductor depresses the rod E, whereby the walls of the slot $e$, in the bar D, draw down the pins $b\ b$, thus bringing the two bodies toward each other and causing the rotation of the outer body over the inner body. This covers or closes the top of the hopper and opens the bottom thereof, whereby the wide mouth originally presented is below and causes, unfailingly, the discharge of the fare into the box. The rod E is now released by the conductor, and the bar D ascending elevates the pins $b\ b$, whereby the bodies B return to their first position, closed below and open above, or uncovering the hopper in condition for reception of the next fare.

It will be noticed that when the pins $b$ move in the curved slots $d$ of the partition C, they have free play in the slot or slots $e$ of the bar D, so as to properly follow the curve of said slots $d$, and that the pin $b$, of the inner body B, moves in curved slot $b'$ of the outer body, so that rotary movements of one body over the other is not interfered with.

F represents the fare-register which is operated by the sliding bar D by means of the connection $g$, or other suitable means.

G represents the gong or bell of the box, and H the hammer thereof, which latter has its spring-arm J extended transversely and horizontally in the space between the partition C and adjacent wall of the box. Attached to the sliding bar D is an arm G' which projects outwardly so as to strike at or about a right angle the spring-arm J of the gong when the bar D is depressed, said spring-arm J being easily forced down by the bar D to a certain extent, when it clears or trips itself, and thus sharply strikes the alarm, Fig. 2 showing the sliding bar D depressed, and the arm G' having cleared the spring-arm of the hammer.

K represents a trap consisting of two leaves jointed to each other and arranged below the hopper of the box, and to the central or jointed portions of the trap there is attached a weighted rod, L, which has vertical sliding motions in guides attached to the box. The width of the trap K is such that fares falling from the hopper will pass freely between the sides of the trap and adjacent walls of the box A, but when the box is overturned or inverted, the trap falls against the bottom of the hopper, which, if closed below, will prevent the escape of the fare from the box through the hopper. If, however, the hopper is open below, the trap folds into the hopper and its sides close against the adjacent sides or edges of the hopper, thus closing communication between the body of the box and the hopper and preventing the return of the collected fare into the hopper. When the box is returned to its proper position, the trap K immediately drops from the hopper, resumes its normal position, and forces the fare to the bottom of the box. The trap K may, however, consist of a curved or bent plate on the top of the rod, or the rod L may enter the open bottom of the hopper, thereby preventing the opening of the top of the hopper and the consequent abstraction of fares. When the box is inverted and the trap K falls into the hopper, the rod L acts as a stop for preventing the return of the two bodies of the hopper to their normal position; consequently, fares resting against the trap K cannot escape further into the hopper, for although the conductor may operate the trigger E, the bodies B cannot re-open beyond the rod L.

Having thus described my invention, what I claim as new, and desire to secure by Letters Patent, is—

1. A fare-box hopper composed of two bodies constructed to rotate and cover and uncover, and having a common axis, substantially as and for the purpose set forth.

2. The two bodies B B, constructed to rotate and cover and uncover, in combination with the operating sliding bar D, the bodies and bar being connected by pins $b$ and slots $e$, substantially as and for the purpose set forth.

3. The sliding rod L, operating in combination with the opening and closing hopper B, substantially as and for the purpose set forth.

4. The trap K and sliding rod L, operating in combination with the opening and closing hopper B, substantially as and for the purpose set forth.

5. The sliding bar D, with arm G', in combination with the horizontal spring hammer-arm J, at an angle thereto, substantially as and for the purpose set forth.

R. M. ROBINSON.

Witnesses:
JOHN A. WIEDERSHEIM,
LEWIS F. BROUS.